US012736708B2

(12) United States Patent
Sun et al.

(10) Patent No.: US 12,736,708 B2
(45) Date of Patent: Sep. 15, 2026

(54) MOBILE RADIATION INSPECTION APPARATUS AND MOBILE RADIATION INSPECTION SYSTEM

(71) Applicants: NUCTECH (BEIJING) COMPANY LIMITED, Beijing (CN); NUCTECH COMPANY LIMITED, Beijing (CN)

(72) Inventors: Shangmin Sun, Beijing (CN); Chunguang Zong, Beijing (CN); Xuejing Yang, Beijing (CN); Xuping Fan, Beijing (CN); Quanwei Song, Beijing (CN); Junping Shi, Beijing (CN); Hui Meng, Beijing (CN); Yang Yang, Beijing (CN); Weifeng Yu, Beijing (CN); Ying Li, Beijing (CN); Dongyu Wang, Beijing (CN); Lei Liu, Beijing (CN); Bicheng Liu, Beijing (CN); Haojie Chi, Beijing (CN)

(73) Assignees: NUCTECH (BEIJING) COMPANY LIMITED, Beijing (CN); NUCTECH COMPANY LIMITED, Beijing (CN)

( * ) Notice: Subject to any disclaimer, the term of this patent is extended or adjusted under 35 U.S.C. 154(b) by 161 days.

(21) Appl. No.: 18/716,943

(22) PCT Filed: Dec. 16, 2022

(86) PCT No.: PCT/CN2022/139764

§ 371 (c)(1),
(2) Date: Jun. 6, 2024

(87) PCT Pub. No.: WO2023/125084

PCT Pub. Date: Jul. 6, 2023

(65) Prior Publication Data

US 2024/0411045 A1 Dec. 12, 2024

(30) Foreign Application Priority Data

Dec. 30, 2021 (CN) ........................ 202111668874.0

(51) Int. Cl.
*G01V 5/22* (2024.01)
*G01N 23/04* (2018.01)

(52) U.S. Cl.
CPC ............... *G01V 5/22* (2024.01); *G01N 23/04* (2013.01)

(58) Field of Classification Search
None
See application file for complete search history.

(56) References Cited

U.S. PATENT DOCUMENTS 5,764,683 A 6/1998 Swift et al.
9,052,403 B2 * 6/2015 Morton .................... G01V 5/22
(Continued)

FOREIGN PATENT DOCUMENTS

CN 2572400 Y 9/2003
CN 1490616 A 4/2004
(Continued)

OTHER PUBLICATIONS

CN104170051A Machine Translaton (Year: 2014).*
(Continued)

*Primary Examiner* — Uzma Alam
*Assistant Examiner* — Djura Malevic
(74) *Attorney, Agent, or Firm* — Kilpatrick Townsend & Stockton LLP

(57) ABSTRACT

A mobile radiation inspection apparatus includes a vehicle body, a traveling mechanism, a boom assembly, a first imaging device, and a second imaging device. The boom assembly is mounted on the vehicle body and is configured to switch between an inspection state and a transportation state. The first imaging device includes a first ray source and a first ray detector both mounted on the boom assembly. The first ray source is positioned at the top of an inspection channel. The second imaging device includes a second ray
(Continued)

source and a second ray detector. The second ray detector cooperates with the second ray source to detect rays emitted by the second ray source, and the second ray source is positioned on a side surface of the inspection channel. The mobile radiation inspection apparatus implements multi-angle and multi-mode scanning.

16 Claims, 6 Drawing Sheets

(56) References Cited

U.S. PATENT DOCUMENTS

2005/0157842 A1* 7/2005 Agrawal ................ G01N 23/04 378/27
2005/0276376 A1 12/2005 Eilbert
2007/0110215 A1 5/2007 Hu et al.
2011/0038453 A1 2/2011 Morton et al.
2012/0033791 A1* 2/2012 Mastronardi .......... G01V 5/223 378/87
2013/0343520 A1* 12/2013 Grodzins ............... G01V 5/232 378/57
2015/0168589 A1 6/2015 Morton et al.
2015/0192531 A1* 7/2015 Li .......................... G01N 23/10 250/360.1
2016/0061989 A1 3/2016 Kang et al.
2020/0315560 A1 10/2020 Okumura

FOREIGN PATENT DOCUMENTS

CN 200996943 Y 12/2007
CN 102012527 A 4/2011
CN 102854539 A 1/2013
CN 104170051 A * 11/2014 ....... G01N 23/20008
CN 204086172 U * 1/2015
CN 105445294 A 3/2016
CN 106290420 A 1/2017
CN 106772650 A 5/2017
CN 206573504 U 10/2017
CN 107861165 A 3/2018
CN 107991323 A 5/2018
CN 108732192 A 11/2018
CN 212872940 U 4/2021
CN 114137622 A 3/2022
CN 217060528 U 7/2022
EP 1645868 A1 4/2006
EP 3715838 A1 * 9/2020 ............ G01N 23/04
RU 2497104 C1 10/2013
RU 154042 U1 8/2015
RU 2731683 C2 9/2020
RU 2758189 C1 10/2021

OTHER PUBLICATIONS

First OA Received in CN Application No. 202111668874.0; mailed Oct. 31, 2024.
Rejection Decision issued in Chinese corresponding application No. 202111668874.0 mailed on Jul. 30, 2025, 18 pages.
ISR received in PCT/CN2022/139764; mailed Mar. 8, 2023.
Written Opinion of ISA received in PCT/CN2022/139764; mailed Mar. 8, 2023.
The third office action and search report issued in Chinese corresponding application 202111668874.0, mailed on Mar. 31, 2026.
The Notice of Allowance and Search Report issued in Chinese corresponding application 2024121387/28(047482), mailed on Jan. 14, 2026.

* cited by examiner

MOBILE RADIATION INSPECTION APPARATUS AND MOBILE RADIATION INSPECTION SYSTEM

CROSS-REFERENCES TO RELATED APPLICATIONS

The present disclosure is a national phase application of International Application No. PCT/CN2022/139764, filed on Dec. 16, 2022, which claims priority to Chinese Patent Application No. 202111668874.0, filed on Dec. 30, 2021, the disclosures of which are hereby incorporated by reference in their entirety.

FIELD

The present disclosure relates to the field of security inspection, and more particularly, to a mobile radiation inspection apparatus and a mobile radiation inspection system.

BACKGROUND

At present, scanning inspection apparatuses are widely used in the field of security inspection to scan and detect objects. According to whether the scanning inspection apparatuses are movable, the scanning inspection apparatuses are classified into a fixed scanning inspection apparatus and a movable scanning inspection apparatus. The fixed scanning inspection apparatus includes a ray source and a detector, which are both mounted at set positions of an inspection site, and their positions are not changeable. During inspecting, the objects to be detected are transported to the inspection site and placed in an inspection channel between the ray source and the detector for inspection. The movable scanning inspection apparatus has the advantage of being able to be transported to other sites. In actual use, the movable scanning inspection apparatus is moved to an area where the objects to be detected are positioned for inspection.

The inventors have found that the related art has at least the following problems: because the movable scanning inspection apparatus needs to be transported to other sites, apparatus parameters of the movable scanning inspection apparatus, such as weight and size, have to meet transportation requirements. Due to limitations of these factors, the movable scanning inspection apparatus is provided with less ray sources and provides few scanning modes.

SUMMARY

The present disclosure provides a mobile radiation inspection apparatus and a mobile radiation inspection system, which are used for expanding functions of the mobile radiation inspection apparatus.

Embodiments of the present disclosure provide a mobile radiation inspection apparatus, which includes:

a vehicle body configured to provide support;

a traveling mechanism mounted on the vehicle body to drive the vehicle body to travel;

a boom assembly mounted on the vehicle body, the boom assembly being configured to switch between an inspection state and a transportation state, and in case that the boom assembly is in the transportation state, the boom assembly is retracted and carried by the vehicle body; and in case that the boom assembly is in the inspection state, the boom assembly is deployed and forms an inspection channel together with the vehicle body;

a first imaging device including a first ray source and a first ray detector both mounted on the boom assembly, and the first ray detector cooperates with the first ray source to detect a ray emitted by the first ray source; and the first ray source is positioned at a top of the inspection channel; and a second imaging device including a second ray source and a second ray detector, and one of the second ray source and the second ray detector is mounted on the vehicle body, and the other one of the second ray source and the second ray detector is mounted on the boom assembly; the second ray source is positioned on a side surface of the inspection channel; and the second ray detector cooperates with the second ray source to detect a ray emitted by the second ray source.

In some embodiments, the first ray source and the first ray detector of the first imaging device jointly form a first plane, and the second ray source and the second ray detector of the second imaging device jointly form a second plane; and the first plane is parallel to the second plane.

In some embodiments, the first imaging device and the second imaging device are independent of each other and are separately controlled.

In some embodiments, the mobile radiation inspection apparatus further includes:

a third imaging device including a third ray source and a third ray detector mounted on the boom assembly or the vehicle body, and the third ray detector cooperates with the third ray source to detect a ray emitted by the third ray source; and the third ray source is positioned on a side surface of the inspection channel.

In some embodiments, the first ray source and the first ray detector of the first imaging device jointly form a first plane, the second ray source and the second ray detector of the second imaging device jointly form a second plane, and the third ray source and the third ray detector of the third imaging device jointly form a third plane, where the first plane, the second plane and the third plane are parallel to each other.

In some embodiments, the first imaging device, the second imaging device and the third imaging device are independent of each other and are separately controlled.

In some embodiments, the boom assembly includes:

a first boom mounted on the vehicle body in a liftable manner, or the first boom being configured to be telescopic, and the first boom including an extended state and a retracted state;

a second boom mounted on the first boom; and a third boom rotatably mounted on the second boom;

In case that the boom assembly is in the transportation state, the first boom is retracted, the second boom and the first boom are jointly rotated to a position where the second boom is parallel to the vehicle body and are positioned at a top of the vehicle body, the third boom is rotated to a position where the third boom is parallel to the second boom, and the third boom is positioned between the second boom and the vehicle body; and in case that the boom assembly is in the inspection state, the first boom stretches out of the top of the vehicle body, the second boom and the first boom are rotated together relative to the vehicle body, and the third boom is rotated to a position where the third boom is perpendicular to the second boom and the third boom is parallel to the first boom; and the first boom, the second boom, the third boom and a side surface of the vehicle body jointly form the inspection channel.

In some embodiments, the first imaging device is mounted on the first boom.

In some embodiments, the mobile radiation inspection apparatus further includes:

a first cabin body fixedly mounted on the vehicle body; and a second cabin body rotatably mounted at a tail of the vehicle body;

In case that the boom assembly is in the transportation state, the second cabin body is positioned at the tail of the vehicle body; and in case that the boom assembly is in the inspection state, the second cabin body is rotated to the side surface of the vehicle body, and both the second cabin body and the boom assembly are positioned in a width direction of the vehicle body and are positioned on two sides of the vehicle body.

In some embodiments, the second ray source is mounted in the second cabin body, the second ray detector is mounted on the third boom, and a total weight of the second cabin body and the second ray source is configured to maintain balance with a total weight of the boom assembly, the first imaging device and the second ray detector and the mobile radiation inspection apparatus remains stable in the width direction of the vehicle body; or, the second ray source is mounted on the third boom, the second ray detector is mounted in the second cabin body, and a total weight of the second cabin body and the second ray detector is configured to maintain balance with a total weight of the boom assembly, the first imaging device and the second ray source and the mobile radiation inspection apparatus remains stable in the width direction of the vehicle body.

In some embodiments, one of the second ray source and the second ray detector is arranged in the second cabin body, and the other one of the second ray source and the second ray detector is arranged on the third boom of the boom assembly.

In some embodiments, at least a side of the second cabin body is configured to be open and in case that the boom assembly is in the inspection state, the second ray source positioned in the second cabin body is prevented from being blocked and directly radiates to an object.

In some embodiments, the third imaging device is arranged in the first cabin body.

In some embodiments, at least a side of the first cabin body is configured to be open and in case that the boom assembly is in the inspection state, the ray emitted by the third ray source positioned in the first cabin body is prevented from being blocked and directly radiates to the object.

In some embodiments, a material of the boom assembly includes an aluminum alloy or a titanium alloy.

In some embodiments, the first imaging device is a backscatter imaging device, the first ray source is a backscatter ray source, and the first ray detector is a backscatter detector; and/or, the second imaging device is a transmission imaging device, the second ray source is a transmission ray source, and the second ray detector is a transmission ray detector.

In some embodiments, the third imaging device is a backscatter imaging device, the third ray source is a backscatter ray source, and the third ray detector is a backscatter detector.

The embodiments of the present disclosure also provide a vehicle-mounted radiation inspection system, which includes the mobile radiation inspection apparatus provided by any embodiments of the present disclosure.

The mobile radiation inspection apparatus provided in the above embodiments simultaneously includes a vehicle body, a traveling mechanism, a boom assembly, a first imaging device, and a second imaging device. The traveling mechanism drives the vehicle body to travel, which synchronously drives the boom assembly, the first imaging device and the second imaging device directly and indirectly mounted on the vehicle body to travel, and both the first imaging device and the second imaging device are conveniently transported to other sites. In addition, the boom assembly is configured to be retractable. In the inspection state, the boom assembly is deployed, and the boom assembly and the vehicle body jointly form an inspection channel. In a transportation mode, the boom assembly is retracted to drive the first imaging device and the second imaging device to also retract to a top of the vehicle body. The vehicle body, the traveling mechanism, the boom assembly, the first imaging device and the second imaging device are kept in a connected relationship whether in the inspection state or the transportation state. Furthermore, the first imaging device and the second imaging device have different imaging principles and different set positions, which implements multi-angle and multi-mode scanning for an object, improves the accuracy of scanning inspection, implements multi-mode and multi-angle scanning of the mobile radiation inspection apparatus, and expands functions of the mobile radiation inspection apparatus.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

REFERENCE NUMERALS IN THE ACCOMPANYING DRAWINGS

1, Vehicle body; 2, Traveling mechanism; 3, Boom assembly; 4, First imaging device; 5, Second imaging device; 6, Third imaging device; 7, First cabin body; 8, Second cabin body; 9, Slewing mechanism; 10, object; 31, First boom; 32, Second boom; 33, Third boom; 321, Beam; 322, Detection arm; 51, Target; 91, Slewing support; and 92, Slewing platform.

DETAILED DESCRIPTION OF THE DISCLOSURE

The embodiments of the present disclosure are described below in more detail with reference to FIG. 1*a* to FIG. 4*c*.

Figure 1A:
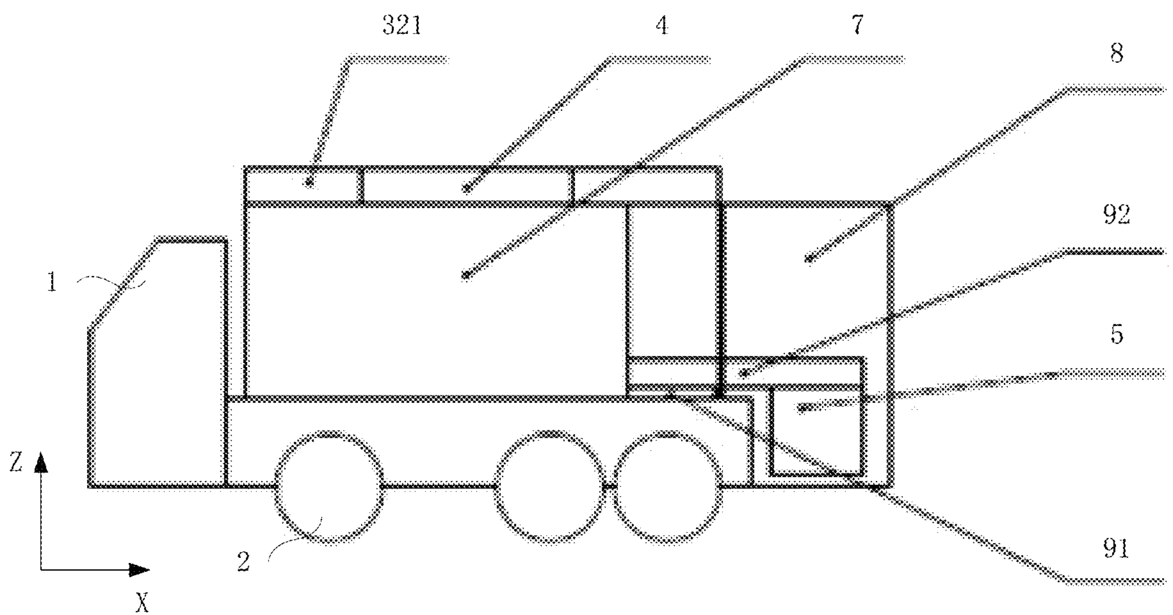
FIG. 1*a* is a schematic front view of a mobile radiation inspection apparatus provided by some embodiments of the present disclosure in a transportation state.
Figure 1B:
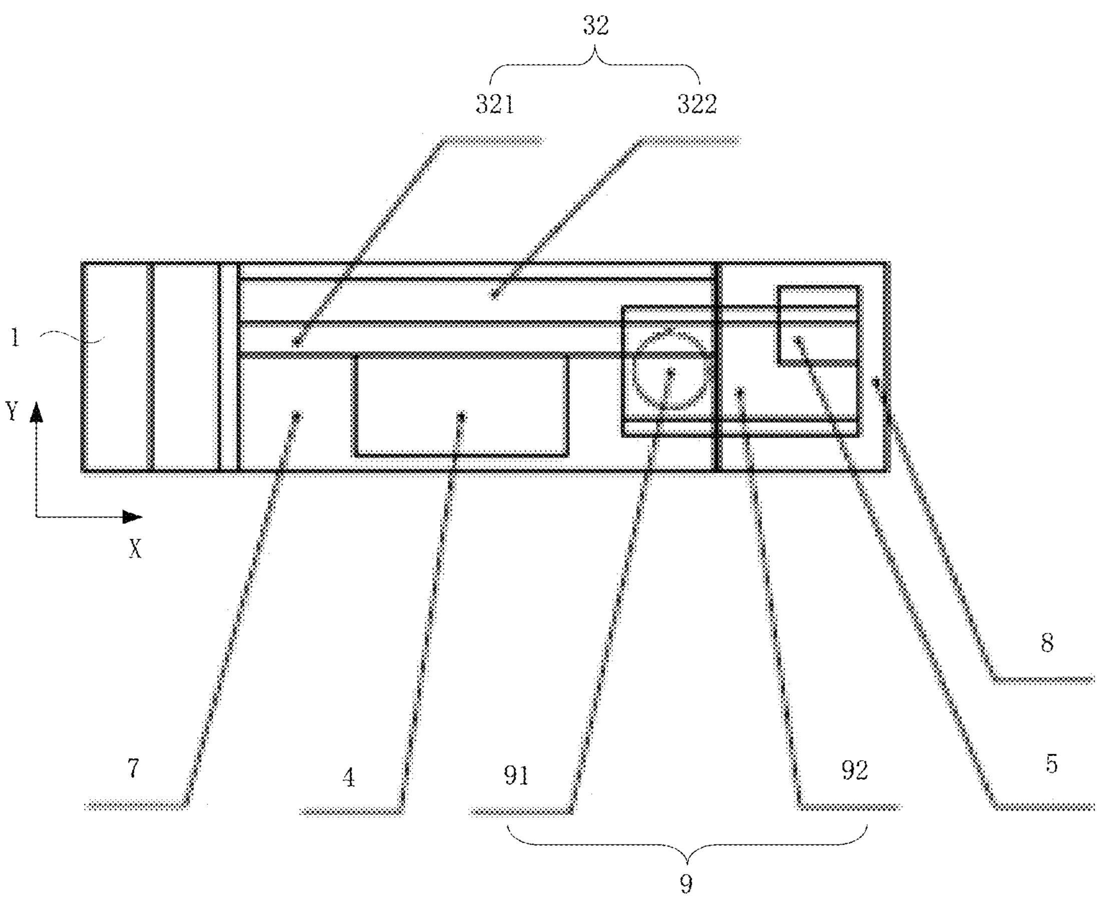
FIG. 1*b* is a schematic top view of a mobile radiation inspection apparatus provided by some embodiments of the present disclosure in a transportation state.
Figure 1C:
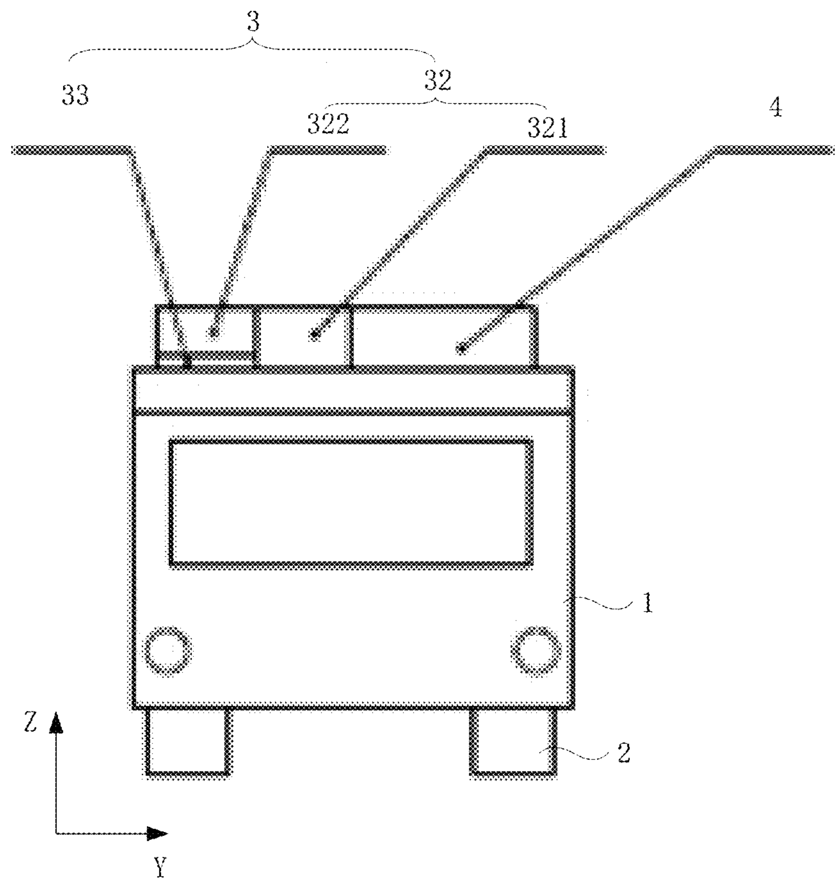
FIG. 1*c* is a schematic left view of a mobile radiation inspection apparatus provided by some embodiments of the present disclosure in a transportation state.

Before introducing the embodiments of the present disclosure of a mobile radiation inspection apparatus, each orientation is defined first. Referring to FIG. 1*a* to FIG. 1*c*, an XYZ coordinate system is established, in which an X direction corresponds to a length direction of a vehicle, a Y direction corresponds to a width direction of the vehicle, and a Z direction corresponds to a height direction of the vehicle.

Referring to FIGS. 1*a* to 2*c*, embodiments of the present disclosure provide a mobile radiation inspection apparatus, which includes a vehicle body 1, a traveling mechanism 2, a boom assembly 3, a first imaging device 4, and a second imaging device 5. The vehicle body 1 is configured to provide support. The traveling mechanism 2 is mounted on the vehicle body 1 to drive the vehicle body 1 to travel.

The mobile radiation inspection apparatus includes a transportation state and an inspection state. When the mobile radiation inspection apparatus is in the transportation state, the boom assembly 3 is also in the transportation state. When the mobile radiation inspection apparatus is in the inspection state, the boom assembly 3 is also in the inspection state.

The vehicle body 1 is a main body part of the mobile radiation inspection apparatus, and is configured to provide a cab, a carriage, a chassis and the like. The traveling mechanism 2 is implemented in various ways such as wheels and tracks. If the wheels are used, two tires are mounted at an end of each axle of the vehicle for mounting tires.

The boom assembly 3 is mounted on the vehicle body 1. The boom assembly 3 is configured to switch between the inspection state and the transportation state. When the boom assembly 3 is in the transportation state, the boom assembly 3 is retracted and carried by the vehicle body 1. Further, components of the mobile radiation inspection apparatus are carried and transported by themselves, and there is no need to disassemble some of the components or rely on other tools for transporting to other sites. When the boom assembly 3 is in the inspection state, the boom assembly 3 is deployed and matched with a side surface of the vehicle body 1 to jointly form an inspection channel. Power required for deploying the boom assembly 3 comes from the mobile radiation inspection apparatus itself, and no additional driving mechanism is provided to drive the boom assembly 3 to deform.

Weight of the boom assembly 3 is a main constituent part of total weight of the mobile radiation inspection apparatus. Carrying capacity of the chassis is determined, and if the boom assembly 3 is overweight, the number of imaging devices that are provided on the mobile radiation inspection apparatus is limited. However, if the boom assembly 3 is too light, the carrying capacity thereof is limited, which also affects the number of the imaging devices. Hence, the boom assembly 3 with weak carrying capacity is able to carry the imaging devices. For the boom assembly 3 with strong carrying capacity, the bearing capacity of the mobile radiation inspection apparatus is limited because of its heavy weight, and the imaging devices is still unable to be mounted. To solve this contradiction, according to the embodiments of the present disclosure, in one embodiment, a material of the boom assembly 3 is optimized, and is selected from lightweight materials with high carrying capacity such as an aluminum alloy or a titanium alloy. In another embodiment, each boom of the boom assembly 3 is provided with a structure such as a reinforcing rib in addition to a main beam, to reduce a risk of bending deformation of the boom assembly 3. In still another embodiment, the main beam of the boom assembly 3 is formed by arranging multiple profiles in parallel, and the main beam of this structure also has relatively high bending performance. The vehicle-mounted inspection apparatus provided in the above embodiments meet transportation limitations of industry laws and regulations on vehicles in terms of weight, size, chassis bearing capacity and the like.

Referring to FIGS. 1*a* to 2*c*, in some embodiments, the boom assembly 3 includes a first boom 31, a second boom 32, and a third boom 33. States of the first boom 31, the second boom 32 and the third boom 33 are switchable. When the boom assembly 3 is in the transportation state, the first boom 31, the second boom 32, and the third boom 33 are positioned at the top of the vehicle body 1 and transported with the vehicle body 1. When the boom assembly 3 is in the inspection state, the first boom 31, the second boom 32 and the third boom 33 are deployed to form an inspection channel P on the side surface of the vehicle body 1. None of the first boom 31, the second boom 32 and the third boom 33 needs to be detached from the vehicle body 1 in either the transportation state or the inspection state. Thus, the first boom 31, the second boom 32 and the third boom 33 always keep connected to the vehicle body 1. In this setting mode, the boom assembly 3 does not need to be disassembled and assembled repeatedly, and thus transportation to other sites is more convenient.

The first boom 31 is mounted on the vehicle body 1 in a liftable manner, and the first boom 31 is mounted at the top of the vehicle body 1. For example, a lifting drive mechanism is provided on the vehicle body 1. The lifting drive mechanism adopts, for example, belt drive and gear drive. When the first boom 31 needs to be raised, the drive mechanism drives the first boom 31 to stretch relative to the vehicle body 1, and the top of the first boom 31 is higher than the top of the vehicle, and the height of the inspection channel formed is relatively high, to meet the inspection requirements of the large-scale and high-load object 10 to be detected. In some embodiments, the first boom 31 is configured to be telescopic. For example, the first boom 31 adopts nested segments. When scanning is needed, the segments are stretched one by one. The first boom 31 includes a stretched state and a retracted state. When the mobile radiation inspection apparatus needs to be transported to other sites, that is, the boom assembly 3 is in the transportation state, the first boom 31 is lowered to be completely positioned inside the vehicle body 1 or partially positioned inside the vehicle body 1, to shorten the height of the first boom 31 stretching out of the vehicle body 1, and the height size of the vehicle meets the requirements of road laws and regulations for vehicles during the transportation of the mobile radiation inspection apparatus to other sites.

The second boom 32 is mounted on the first boom 31, and they are fixedly connected, for example, by means of fasteners such as bolts. The first boom 31 is mounted on a slewing platform 92 which is described hereinafter. The slewing platform 92 drives the first boom 31, the second boom 32 and the third boom 33 to rotate synchronously with respect to the vehicle body 1. In the inspection state, the second boom 32 serves as a top beam of the inspection channel. The first imaging device 4 described above is mounted on the second boom 32. The first imaging device 4 keeps connected to the second boom 32 regardless of whether the second boom 32 is in the inspection state or the transportation state, and a relative positional relationship between the first imaging device 4 and the second boom 32 remains unchanged. In some embodiments, the second boom 32 includes a beam 321 and a detection arm 322, which are fixedly connected to achieve effects of reducing the weight and guaranteeing the carrying capacity. The detection arm 322 is positioned on a side surface of the beam 321. The side surface herein is taken as an example in the inspection state, that is, the detection arm 322 is positioned in a direction of the beam 321 passing through the inspection channel along the object 10. In one embodiment, the relative positions of the detection arm 322 and the beam 321 illustrated in FIG. 2*b* and FIG. 2*c* are adopted. When the boom assembly 3 is in the transportation state, the first boom 31 is retracted; and the second boom 32 and the first boom 31 are jointly rotated, under the drive of the slewing platform 92, to a position where the second boom 32 is parallel to the vehicle body 1 and are positioned at the top of the vehicle body 1. When the boom assembly 3 is in the inspection state, the first boom 31 stretches out of the top of the vehicle body 1, the second boom 32 and the first boom 31 are rotated together, and the second boom 32 is mostly positioned outside the vehicle body 1.

The third boom 33 is rotatably mounted on the second boom 32. Referring to FIG. 1*c*, in the transportation state, the third boom 33 is in the retracted state, the third boom 33 is positioned below the detection arm 322 of the second boom 32, the third boom 33 and the detection arm 322 are stacked together, and a total height of the third boom 33 and the detection arm 322 stacked together is substantially equal to a total height of the beam 321. In this way, the heights of the second boom 32 and the third boom 33 in the transportation state is reduced, and the overall height size of the mobile radiation inspection apparatus is smaller, which better meets requirements of transportation to other sites and requirements of road driving. When the boom assembly 3 is in the inspection state, the third boom 33 is parallel to the first boom 31, and the third boom 33 and the first boom 31 are arranged at two ends of the second boom 32. The first boom 31, the second boom 32 and the third boom 33 are matched with the vehicle body 1 to jointly form the inspection channel.

An overall introduction is made below to changes of the boom assembly 3 in the transportation state and the inspection state.

As shown in FIGS. 1*a* to 1*c*, when the boom assembly 3 is in the transportation state, the first boom 31 is retracted; the second boom 32 and the first boom 31 are jointly rotated to a position parallel to the vehicle body 1 and are positioned at the top of the vehicle body 1; and the third boom 33 is rotated to a position parallel to the second boom 32, and the third boom 33 is positioned between the second boom 32 and the vehicle body 1.

Figure 2A:
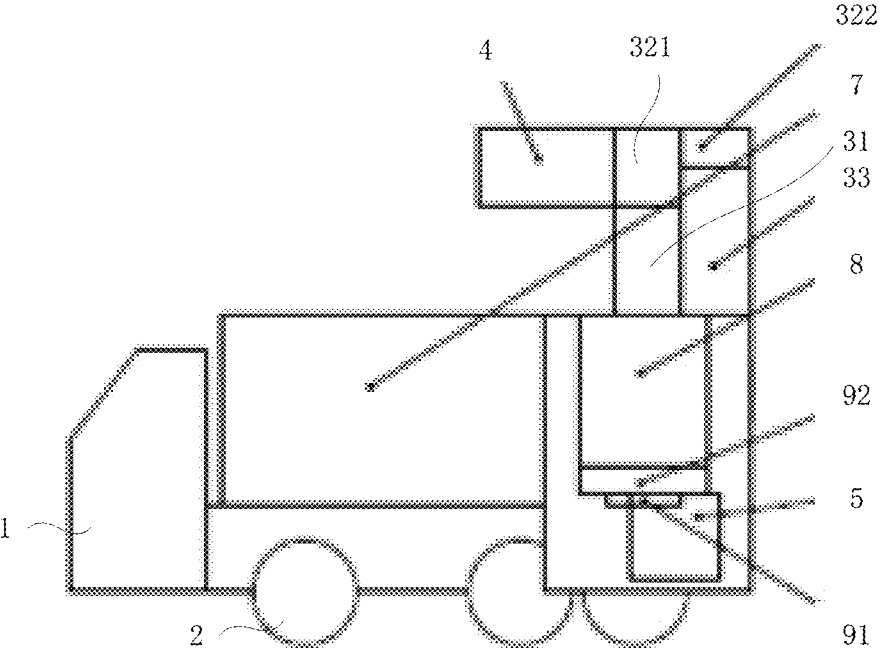
FIG. 2*a* is a schematic front view of a mobile radiation inspection apparatus provided by some embodiments of the present disclosure in an inspection state.
Figure 2B:
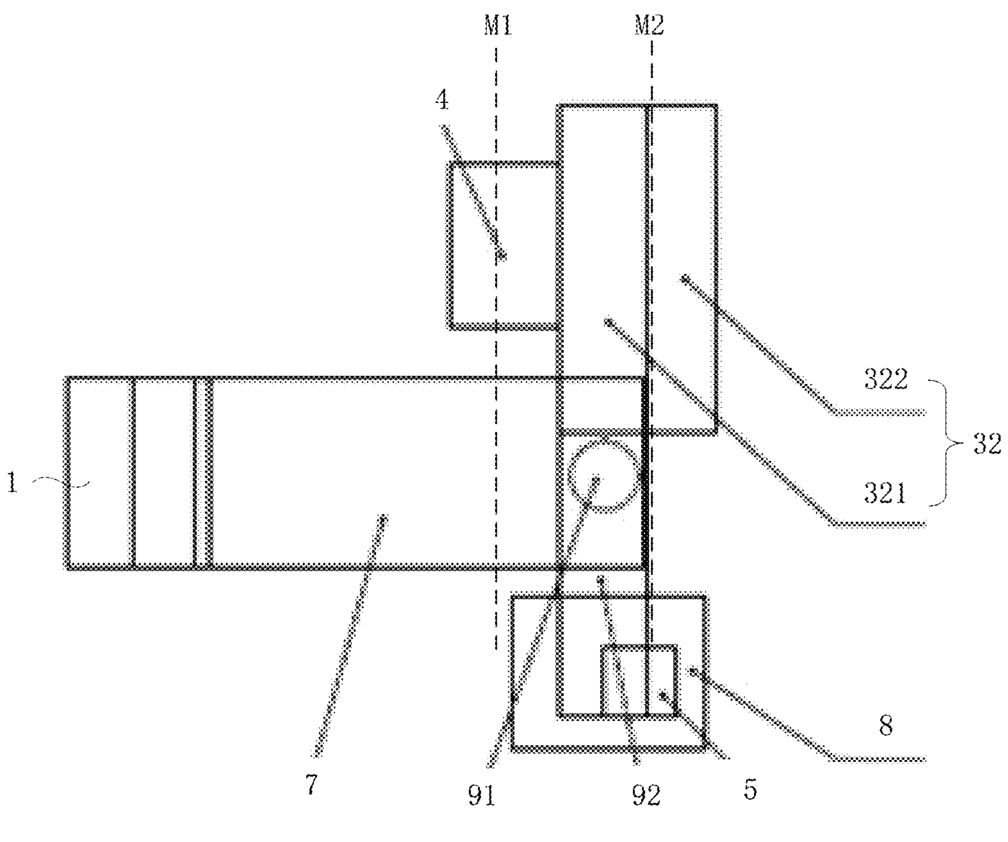
FIG. 2*b* is a schematic top view of a mobile radiation inspection apparatus provided by some embodiments of the present disclosure in an inspection state.
Figure 2C:
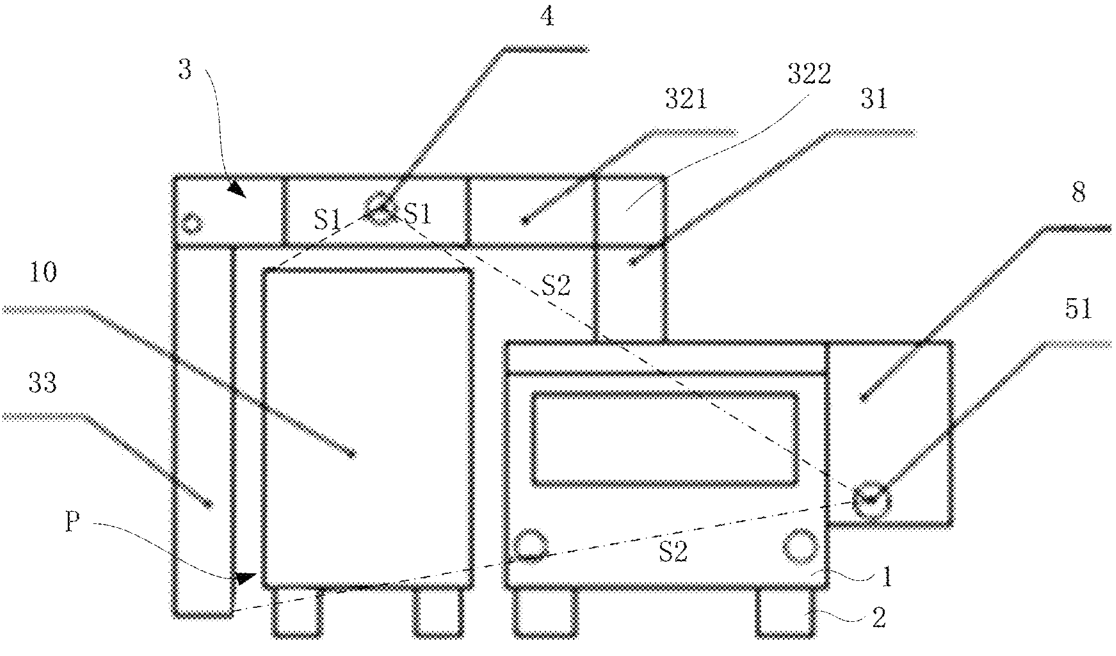
FIG. 2*c* is a schematic left view of a mobile radiation inspection apparatus provided by some embodiments of the present disclosure in an inspection state.
Figure 3A:
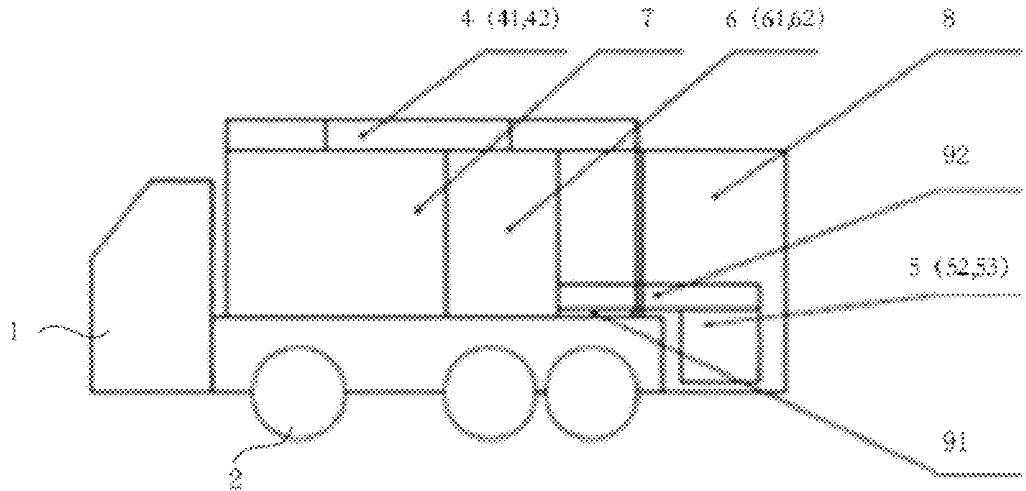
FIG. 3*a* is a schematic front view of a mobile radiation inspection apparatus provided by some embodiments of the present disclosure in a transportation state.
Figure 3B:
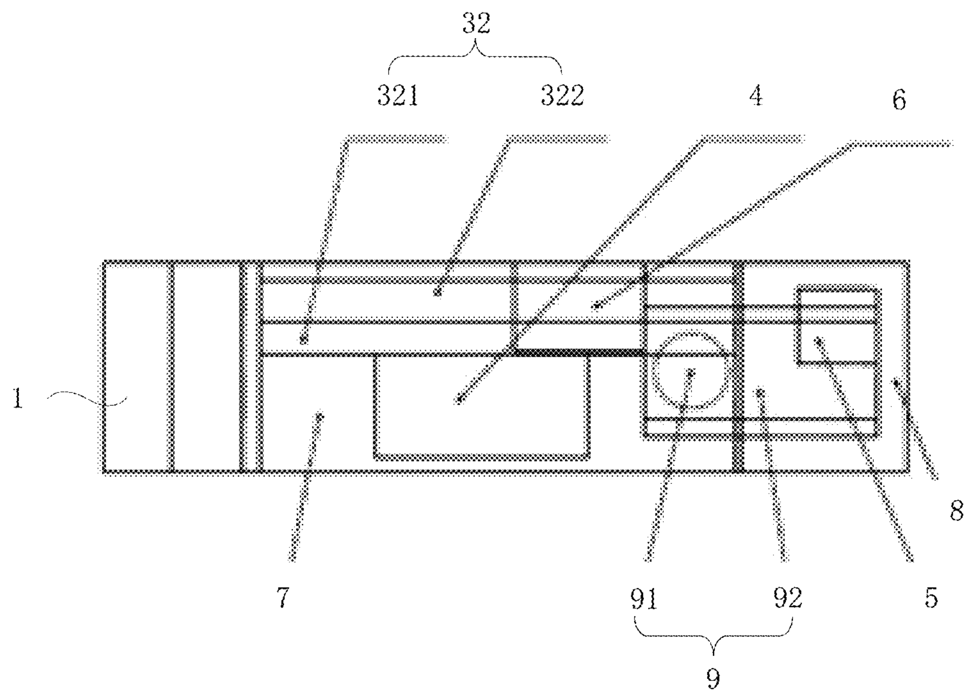
FIG. 3*b* is a schematic top view of a mobile radiation inspection apparatus provided by some embodiments of the present disclosure in a transportation state.
Figure 3C:
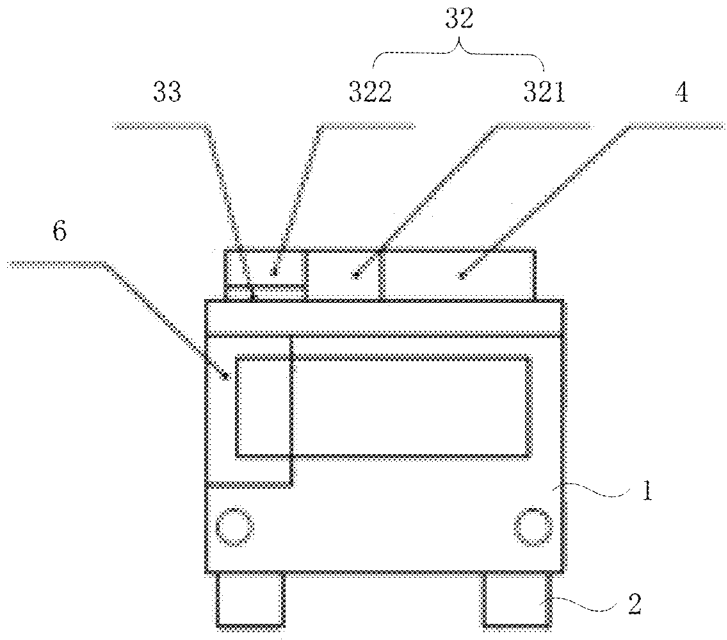
FIG. 3*c* is a schematic left view of a mobile radiation inspection apparatus provided by some embodiments of the present disclosure in a transportation state.

As shown in FIGS. 2*a* to 2*c*, when the boom assembly 3 is in the inspection state, the first boom 31 stretches out of the top of the vehicle body 1, the second boom 32 is perpendicular to the first boom 31 and is mostly positioned outside the vehicle body 1, and the third boom 33 is rotated to a position perpendicular to the second boom 32 and is parallel to the first boom 31. The first boom 31, the second boom 32 and the third boom 33 jointly form the inspection channel on a side surface of the vehicle body 1, where a position of the inspection channel is shown in FIG. 2*b* and FIG. 2*c*.

With continued reference to FIGS. 1*a* to 2*c*, in some embodiments, the mobile radiation inspection apparatus further includes a first cabin body 7 and a second cabin body 8. The first cabin body 7 and the second cabin body 8 are closed cabin bodies or open cabin bodies. Whether the cabin bodies are closed or not depends on whether scanning rays are required to penetrate through walls of the cabin bodies. The cabin bodies are set to be closed if the rays penetrating through the walls of the cabin bodies does not adversely affect or less adversely affect scanning inspection effects. If the rays penetrating through the walls of the cabin bodies may adversely affect the scanning inspection effects, the cabin bodies need to be set to be open in a path of the rays, and the rays can complete the scanning inspection operation well.

The first cabin body 7 is fixedly mounted on the vehicle body 1, for example, by means of bolt connection or the like. In the inspection state and the transportation state, the position of the first cabin body 7 relative to the vehicle body 1 is fixed, and no relative movement occurs between the first cabin body 7 and the vehicle body 1.

The second cabin body 8 is rotatably mounted at the tail of the vehicle body 1. When the boom assembly 3 is in the transportation state, the second cabin body 8 is positioned at the tail of the vehicle body 1. When the boom assembly 3 is in the inspection state, the second cabin body 8 is rotated to the side surface of the vehicle body 1, and both the second cabin body 8 and the boom assembly 3 are positioned in the width direction of the vehicle body 1 and are positioned on two sides of the vehicle body 1.

In some embodiments, the vehicle body 1 is provided with a slewing mechanism 9, and the second cabin body 8 is mounted on the slewing mechanism 9, and the second cabin body 8 is driven by the slewing mechanism 9 to rotate, to implement the switching between the transportation state and the inspection state of the second cabin body 8. The slewing mechanism 9 includes a slewing support 91 and a slewing platform 92. The slewing support 91 is rotatably mounted on the vehicle body 1, the slewing platform 92 is mounted on the slewing support 91, and the second cabin body 8 is mounted on the slewing platform 92. An external force drives the slewing platform 92 and the second cabin body 8 to rotate synchronously.

Arrangement of each radiation imaging device is described below.

Referring to FIGS. 1*a* to 2*c*, as described above, the mobile radiation inspection apparatus includes a first imaging device 4 and a second imaging device 5.

The first imaging device 4 includes a first ray source 41 and a first ray detector 42 both mounted on the boom assembly 3. The first ray detector cooperates with the first ray source to detect a ray emitted by the first ray source; and the first ray source is positioned at the top of the inspection channel. The first imaging device 4 employs a backscatter principle for imaging, where both the first ray source and the first ray detector of the first imaging device 4 are mounted on a same side of the object 10. Referring to FIG. 2*c*, taking a direction indicated by the inspection state as an example, both the first ray source and the first ray detector are mounted on the top of the boom assembly 3. That is, the first imaging device 4 is mounted on the second boom 32, and mounted on the beam 321 of the second boom 32. The first imaging device 4 is configured to scan from the top of the object 10. In some embodiments, the first imaging device 4 is a backscatter imaging device. The first ray source is a backscatter ray source, and the first ray detector is a backscatter detector.

Referring to FIG. 2*b* and FIG. 2*c*, the second imaging device 5 includes a second ray source 52 and a second ray detector 53 both mounted on the vehicle body 1 and/or the boom. The second ray detector cooperates with the second ray source to detect the rays emitted by the second ray source. The second ray source is positioned on the side surface of the inspection channel P. One of the second radiation source and the second radiation detector is mounted on the vehicle body 1, and the other one of the second radiation source and the second radiation detector is mounted on the boom assembly 3. In one embodiment, the second ray source is mounted on the vehicle body 1, and the second ray detector is mounted on the third boom 33 of the boom assembly 3. A position of a target 51 of the second imaging device 5 is shown in FIG. 2*c*. In some embodiments, the second imaging device 5 is a transmission imaging device, the second ray source is a transmission ray source, and the second ray detector is a transmission ray detector.

In FIG. 2*c*, a dotted line S1 indicates a ray path of the first imaging device 4. A single-dot line S2 indicates a ray path of the second imaging device 5. As can be seen from FIG. 2*c*, the ray of the first imaging device 4 does not completely penetrate through the object 10. The ray of the second imaging device 5 completely penetrates through the object 10.

With continued reference to FIG. 2*b*, the first ray source and the first ray detector of the first imaging device 4 jointly form a first (beam) plane M1, and the second ray source and the second ray detector of the second imaging device 5 jointly form a second (beam) plane M2, where the first plane M1 is parallel to the second plane M2. By means of this setting mode, a signal from the first imaging device 4 and a signal from the second imaging device 5 do not interfere with each other, and detection of the object 10 is implemented in multiple ways and at multiple angles.

In some embodiments, the first imaging device 4 and the second imaging device 5 are independent of each other and are separately controlled. Parameters such as start-stop, dose control and working time of the first imaging device 4 and the second imaging device 5 are separately controlled and do not affect each other.

In some embodiments, the second ray source is arranged in the second cabin body 8, and the second ray detector is arranged on the third boom 33 of the boom assembly 3. In some embodiments, the second ray source is arranged on the third boom 33 of the boom assembly 3, and the second ray detector is arranged in the second cabin body 8.

In some embodiments, following weight balancing solutions are employed to maintain the balance of the mobile radiation inspection apparatus in the width direction of the vehicle according to different mounting positions of the second ray source and the second ray detector.

In a first case, the second ray source is mounted in the second cabin body 8, and the second ray detector is mounted on the third boom 33. A total weight of the second cabin body 8 and the second ray source is configured to maintain balance with a total weight of the boom assembly 3, the first imaging device 4 and the second ray detector and the mobile radiation inspection apparatus remains stable in the width direction of the vehicle body 1.

In a second case, the second radiation source is mounted on the third boom 33, and the second radiation detector is mounted in the second cabin body 8. A total weight of the second cabin body 8 and the second ray detector is configured to maintain balance with a total weight of the boom assembly 3, the first imaging device 4 and the second ray source and the mobile radiation inspection apparatus remains stable in the width direction of the vehicle body 1.

In some embodiments, at least a side of the second cabin body 8 is configured to be open and when the boom assembly is in the inspection state, the second ray source positioned in the second cabin body 8 is prevented from being blocked and directly radiates to the object 10 to be detected.

Referring to FIGS. 3*a* to 4*c*, some other embodiments are described below. These embodiments differ from the above embodiments in that in these embodiments the mobile radiation inspection apparatus is further provided with a third imaging device 6 in addition to the first imaging device 4 and the second imaging device 5 described above.

Parts identical to those in the above embodiments, such as the structures of the vehicle body 1 and the boom assembly 3, are not described herein again, and contents related to the third imaging device 6 are described emphatically herein.

Referring to FIGS. 3*a* to 4*c*, in some embodiments, the mobile radiation inspection apparatus further includes a third imaging device 6, which includes a third ray source 61 and a third ray detector 62 both mounted on the boom assembly 3 or the vehicle body 1. The third ray detector cooperates with the third ray source to detect a ray emitted by the third ray source; and the third ray source is positioned on the side surface of the inspection channel P. In some embodiments, the third imaging device 6 is a backscatter imaging device, the third ray source is a backscatter ray source, and the third ray detector is a backscatter detector.

Figure 4A:
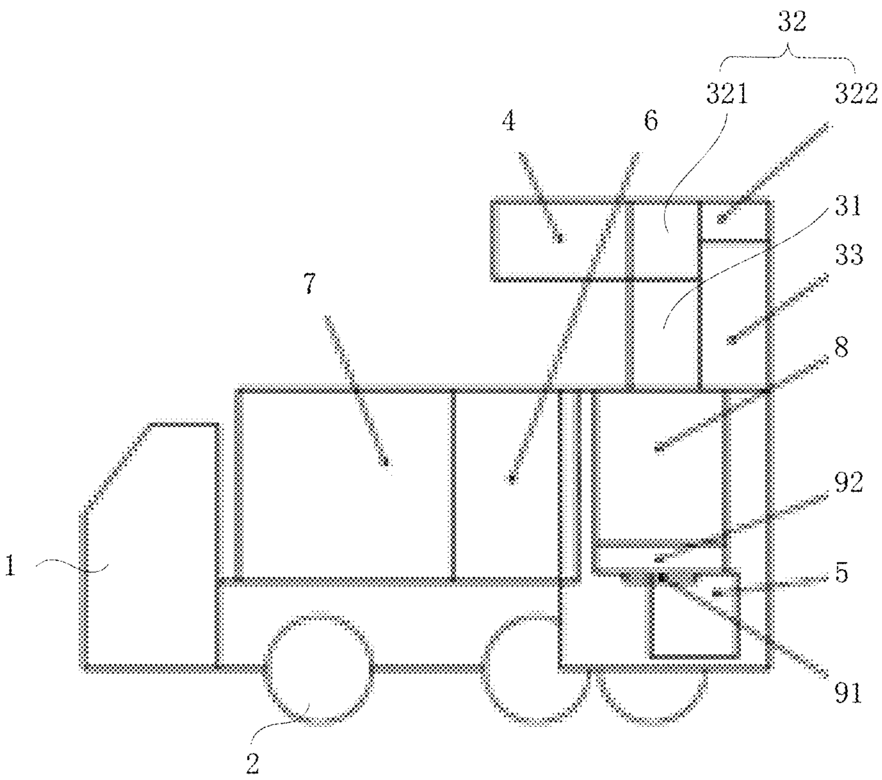
FIG. 4*a* is a schematic front view of a mobile radiation inspection apparatus provided by some embodiments of the present disclosure in an inspection state.
Figure 4B:
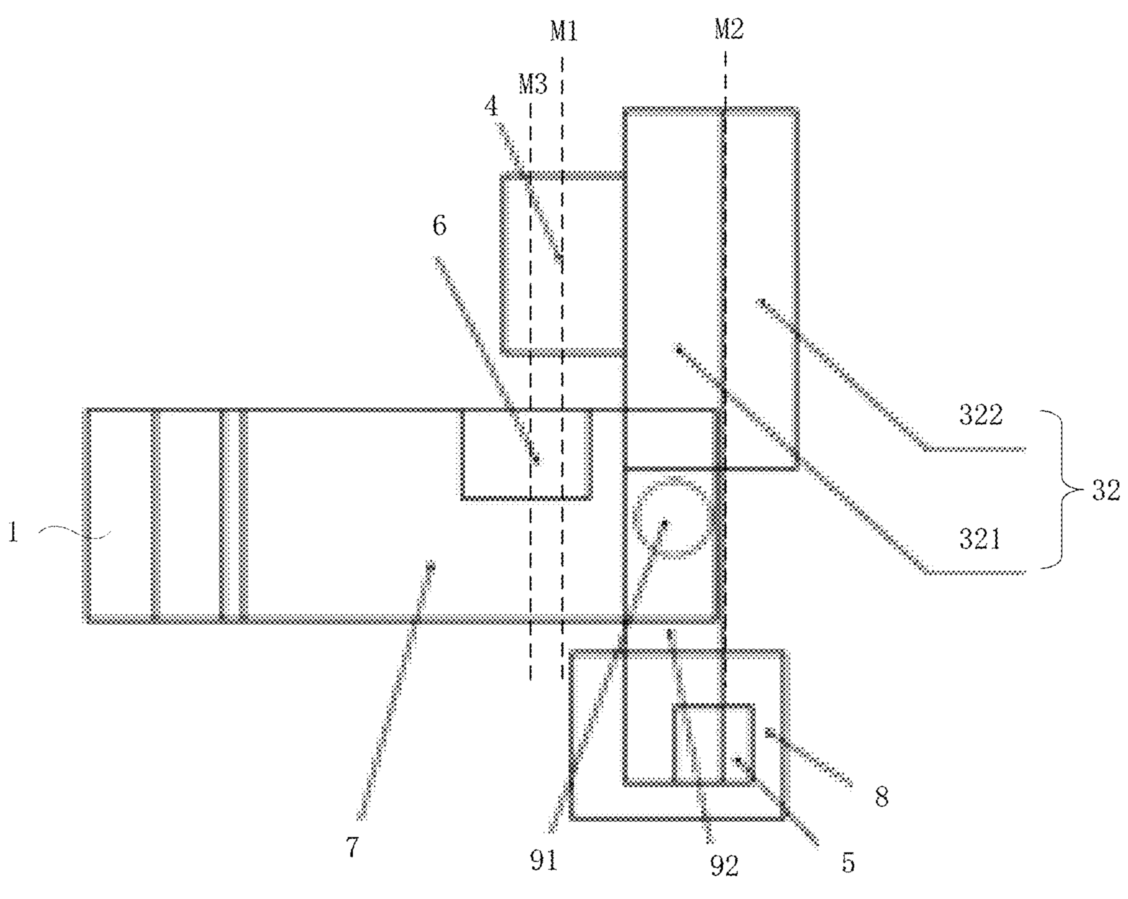
FIG. 4*b* is a schematic top view of a mobile radiation inspection apparatus provided by some embodiments of the present disclosure in an inspection state.

Referring to FIG. 4*b*, the first ray source and the first ray detector of the first imaging device 4 jointly form a first plane M1, and the second ray source and the second ray detector of the second imaging device 5 jointly form a second plane M2, and the third ray source and the third ray detector of the third imaging device 6 jointly form a third (beam) plane M3, where the first plane M1, the second plane M2 and third plane M3 are parallel to each other.

Figure 4C:
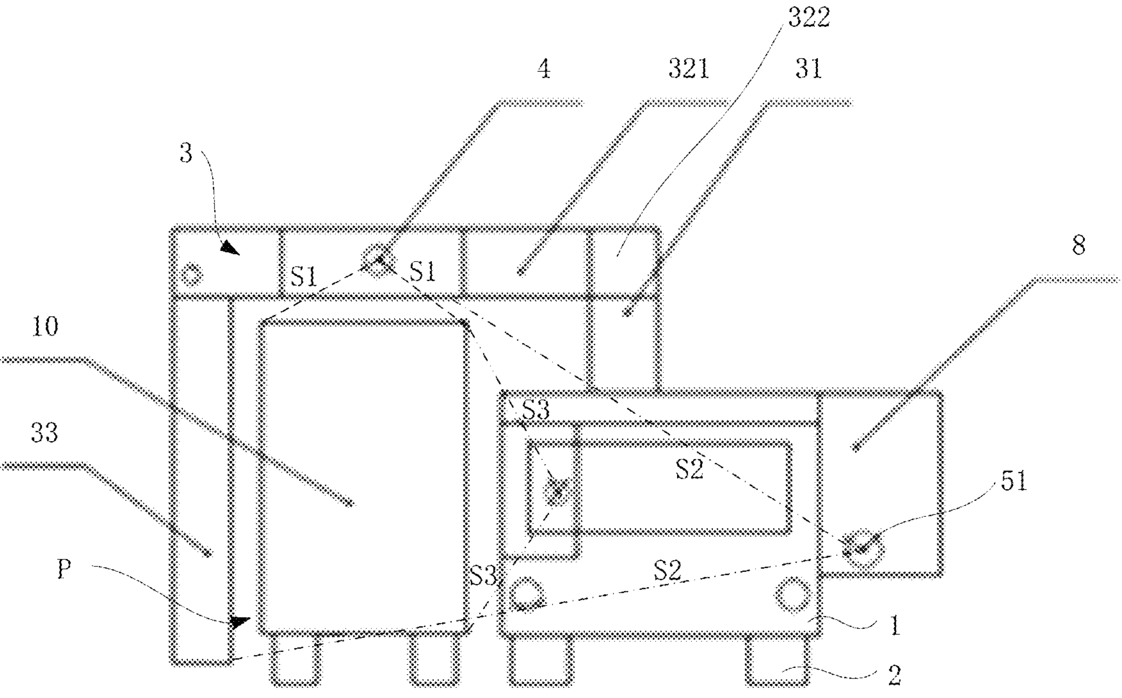
FIG. 4*c* is a schematic left view of a mobile radiation inspection apparatus provided by some embodiments of the present disclosure in an inspection state.

In FIG. 4*c*, the dotted line S1 indicates the ray path of the first imaging device 4. A single-dot line S2 indicates a ray path of the second imaging device 5. A double-dot line S3 indicates a ray path of the third imaging device 6. As can be seen from FIG. 4*c*, the ray of the first imaging device 4 scans the object from the top and does not completely penetrate through the object 10. The ray of the second imaging device 5 completely penetrates through the object 10 from a side surface of the object 10. The ray of the third imaging device 6 scans the object 10 from a side surface and does not completely penetrate through the object 10.

In some embodiments, the first imaging device 4, the second imaging device 5 and the third imaging device 6 are independent of each other and are separately controlled.

Parameters such as start-stop, dose control and working time of the first imaging device 4, the second imaging device 5 and the third imaging device 6 are separately controlled and do not affect each other.

In some embodiments, the third imaging device 6 is arranged in the first cabin body 7. To achieve a better scanning effect, at least one side of the first cabin body 7 is configured to be open and when the boom assembly 3 is in the inspection state, the third ray source positioned in the first cabin body 7 is prevented from being blocked and directly radiates to the object 10 to be detected.

The embodiments of the present disclosure also provide a vehicle-mounted radiation inspection system, which includes the mobile radiation inspection apparatus provided by any embodiments of the present disclosure.

In description of the present disclosure, it needs to be appreciated that orientation or position relations denoted by the terms "center", "longitudinal", "transverse", "front", "rear", "left", "right", "vertical", "horizontal", "top', "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

Finally, it should be noted that the above embodiments are only used for describing rather than limiting the embodiments of the present disclosure. Although the present disclosure is described in detail with reference to the embodiments, Modifications to the specific implementations in the present disclosure or make equivalent substitutions to part of features thereof; and such modifications and equivalent substitutions should be encompassed within the scope of the embodiments sought for protection in the present disclosure so long as they do not depart from the embodiments of the present disclosure.

What is claimed is:

1. A mobile radiation inspection apparatus, comprising:

a vehicle body configured to provide support;

a traveling mechanism mounted on the vehicle body, to drive the vehicle body to travel;

a boom assembly mounted on the vehicle body, the boom assembly being configured to switch between an inspection state and a transportation state, wherein in case that the boom assembly is in the transportation state, the boom assembly is retracted and carried by the vehicle body; and in case that the boom assembly is in the inspection state, the boom assembly is deployed and forms an inspection channel together with the vehicle body;

a first imaging device comprising a first ray source and a first ray detector both mounted on the boom assembly, wherein the first ray detector cooperates with the first ray source to detect a ray emitted by the first ray source; and the first ray source is positioned at a top of the inspection channel; both the first rav source and the first ray detector of the first imaging device are mounted on a same side of an object; and a second imaging device comprising a second ray source and a second ray detector, wherein a first of the second ray source and the second ray detector is mounted on the vehicle body, and a second of the second ray source and the second ray detector is mounted on the boom assembly; the second ray source is positioned on a side surface of the inspection channel; and the second ray detector cooperates with the second ray source to detect a ray emitted by the second ray source;

wherein the boom assembly comprises;

a first boom mounted on the vehicle body in a liftable manner; or the first boom being configured to be telescopic, and the first boom comprised state and a retracted state;

a second boom mounted on the first boom; and a third boom rotatably mounted on the second boom;

wherein in case that the boom assembly is in the transportation state, the first boom is retracted, the second boom and the first boom are jointly rotated a position where the second boom s parallel to the vehicle body and are positioned at a top of the vehicle body, the third boom is rotated to a position parallel to the second boom, and the third boom is positioned between the second boom and the vehicle body; and in case that the boom assembly is in the inspection state, the first boom stretches out of the top of the vehicle body, the second boom and the first boom are rotated together relative to the vehicle body, and the third boom is rotated to a position perpendicular to the second boom and is parallel to the first boom; and the first boom, the second boom, the third boom and a side surface of the vehicle body jointly form the inspection channel;

wherein the first imaging device is a backscatter imaging device, the first ray source is a backscatter ray source, and the first rav detector is a backscatter detector, and/or, the second imaging device is a transmission imaging device, the second ray source is a transmission ray source, and the second ray detector is a transmission ray detector.

2. The mobile radiation inspection apparatus according to claim 1, wherein the first ray source and the first ray detector of the first imaging device jointly form a first plane, and the second ray source and the second ray detector of the second imaging device jointly form a second plane; and the first plane is parallel to the second plane.

3. The mobile radiation inspection apparatus according to claim 1, wherein the first imaging device and the second imaging device are independent of each other and are separately controlled.

4. The mobile radiation inspection apparatus according to claim 1, further comprising:

a third imaging device comprising a third ray source and a third ray detector mounted on the boom assembly or the vehicle body, wherein the third ray detector cooperates with the third ray source to detect a ray emitted by the third ray source; and the third ray source is positioned on a side surface of the inspection channel.

5. The mobile radiation inspection apparatus according to claim 4, wherein the first ray source and the first ray detector of the first imaging device jointly form a first plane, the second ray source and the second ray detector of the second imaging device jointly form a second plane, and the third ray source and the third ray detector of the third imaging device jointly form a third plane, where the first plane, the second plane and the third plane are parallel to each other.

6. The mobile radiation inspection apparatus according to claim 4, wherein the first imaging device, the second imaging device and the third imaging device are independent of each other and are separately controlled.

7. The mobile radiation inspection apparatus according to claim 1, wherein the first imaging device is mounted on the first boom.

8. The mobile radiation inspection apparatus according to claim 1, further comprising:

a first cabin body fixedly mounted on the vehicle body; and a second cabin body rotatably mounted on a tail of the vehicle body;

wherein in case that the boom assembly is in the transportation state, the second cabin body is positioned at the tail of the vehicle body; and in case that the boom assembly is in the inspection state, the second cabin body is rotated to the side surface of the vehicle body, and both the second cabin body and the boom assembly are positioned in a width direction of the vehicle body and are positioned on two sides of the vehicle body.

9. The mobile radiation inspection apparatus according to claim 8, wherein the second ray source is mounted in the second cabin body, the second ray detector is mounted on the third boom, and a total weight of the second cabin body and the second ray source is configured to maintain balance with a total weight of the boom assembly, the first imaging device and the second ray detector such that the mobile radiation inspection apparatus remains stable in the width direction of the vehicle body; or, the second ray source is mounted on the third boom, the second ray detector is mounted in the second cabin body, and a total weight of the second cabin body and the second ray detector is configured to maintain balance with a total weight of the boom assembly, the first imaging device and the second ray source such that the mobile radiation inspection apparatus remains stable in the width direction of the vehicle body.

10. The mobile radiation inspection apparatus according to claim 8, wherein one of the second ray source and the second ray detector is arranged in the second cabin body, and the second of the second ray source and the second ray detector is arranged on the third boom of the boom assembly.

11. The mobile radiation inspection apparatus according to claim 10, wherein at least a side of the second cabin body is configured to be open such that in case that the boom assembly is in the inspection state, the second ray source positioned in the second cabin body is prevented from being blocked and directly radiates to an object.

12. The mobile radiation inspection apparatus according to claim 4, wherein the third imaging device is arranged in a first cabin body.

13. The mobile radiation inspection apparatus according to claim 12, wherein at least a side of the first cabin body is configured to be open such that in case that the boom assembly is in the inspection state, the ray emitted by the third ray source positioned in the first cabin body is prevented from being blocked and directly radiates to an object.

14. The mobile radiation inspection apparatus according to claim 1, wherein a material of the boom assembly comprises an aluminum alloy or a titanium alloy.

15. The mobile radiation inspection apparatus according to claim 4, wherein the third imaging device is a backscatter imaging device, the third ray source is a backscatter ray source, and the third ray detector is a backscatter detector.

16. A vehicle-mounted radiation inspection system, comprising the mobile radiation inspection apparatus according to claim 1.

* * * * *